Patented May 30, 1944

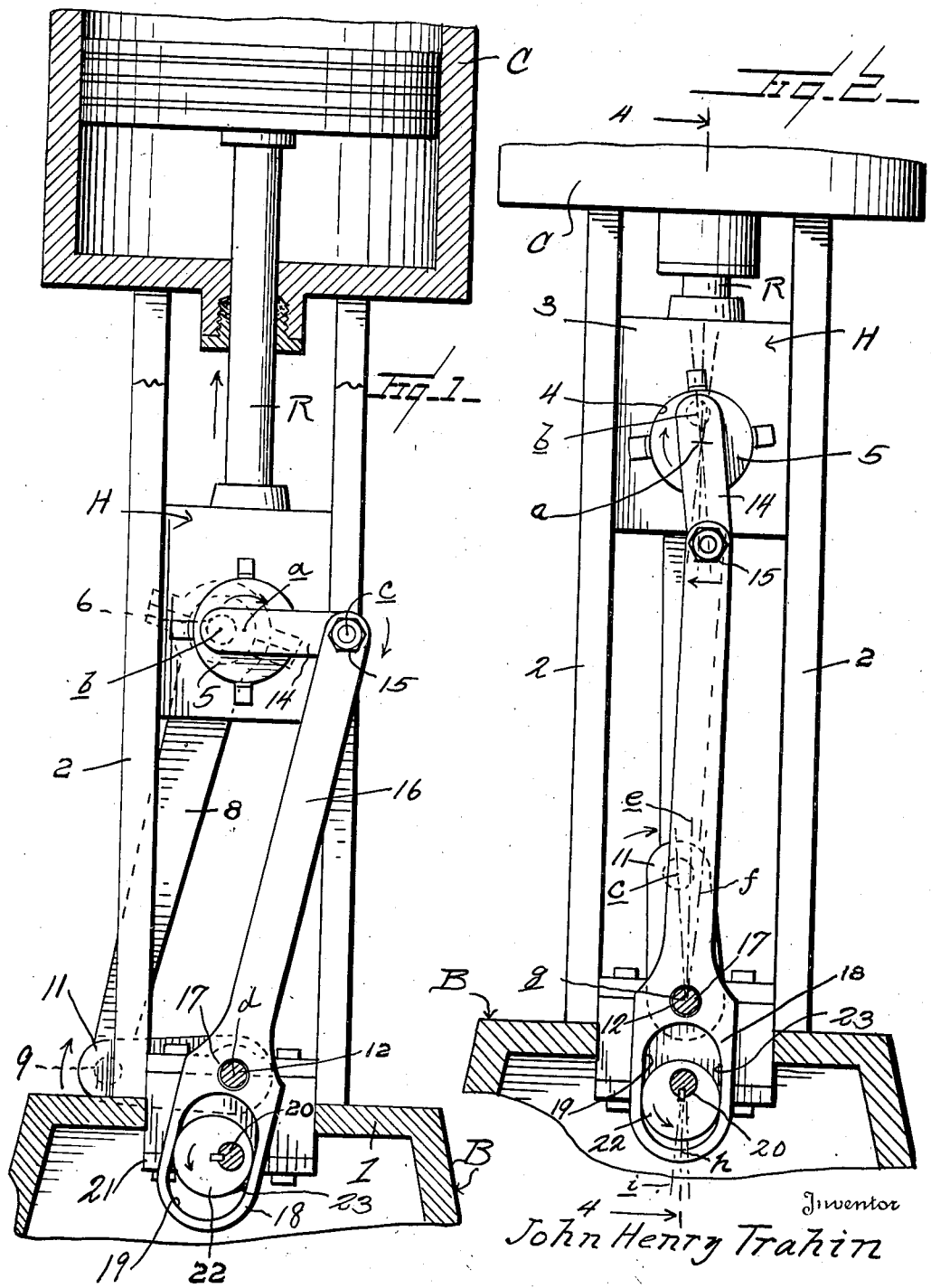

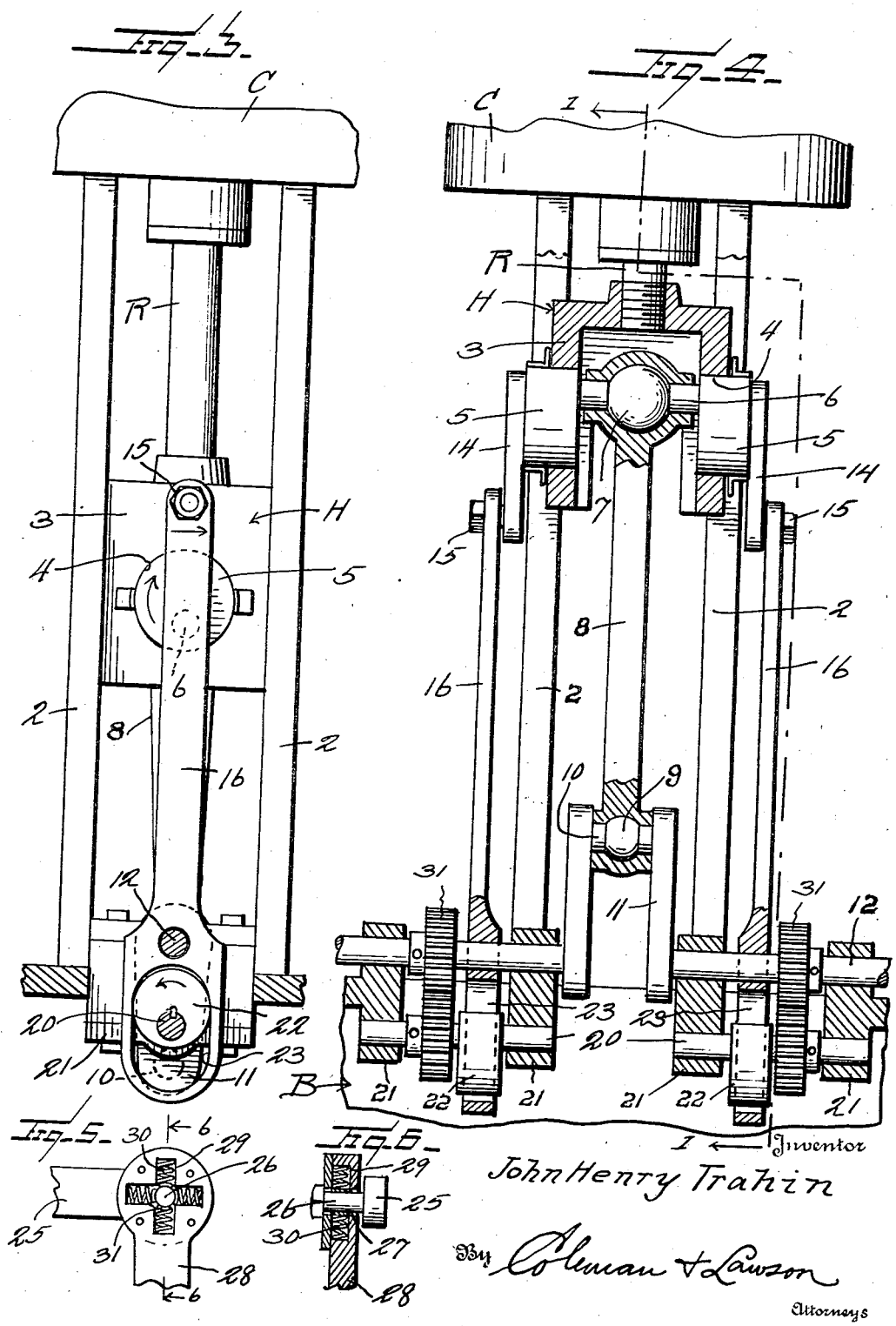

2,350,203

UNITED STATES PATENT OFFICE 2,350,203

MECHANISM TO INCREASE THE EFFICIENCY OF ENGINES

John Henry Trahin, Beaumont, Tex.

Application July 22, 1942, Serial No. 451,907

10 Claims. (Cl. 74—36)

This invention relates to a mechanism to increase the efficiency of an engine, and it is primarily an object of the invention to provide a mechanism of this kind wherein the desired result is obtained by true circular movements, with the elimination of any eccentric movement.

It is also an object of the invention to provide a mechanism of this kind including a cross-head provided with a rotatable member revolving about a true center, together with a pitman operatively connected with said rotatable member at a point eccentric to its center and with a crankshaft, together with means coacting with said rotatable member and operating upon reciprocation of the crosshead to effect rotation of the rotatable member to increase the pitman thrust without increasing the stroke of the operating piston or, in other words, without increasing the capacity of the cylinder in which said piston operates.

It is also an object of the invention to provide a mechanism of this kind including a crosshead carrying a rotatable member with which a pitman is eccentrically connected, said pitman being also operatively connected with the crankshaft, together with means including a rod operating upon reciprocation of the crosshead to effect rotation of the rotatable member of the crosshead and wherein means are provided to prevent dead centering of such rod when the crosshead is at the limit of its movement in either direction, and it is a further object of the invention to provide a structure wherein the means for preventing dead centering of the rod is made effective during the period of movement of the crankshaft when the crosshead is at the limit of its movement in either direction.

An additional object of the invention is to provide a mechanism of this kind employed in connection with a crosshead, a crankshaft and a pitman operatively connecting the crosshead and crankshaft, and wherein the crosshead pin operatively connecting the pitman to the crosshead is set eccentrically from the center of torque and whereby the movement of said crosshead pin coordinates with the movement of the crankshaft and the crosshead to produce an increased power thrust and power application to the shaft.

The invention consists in the details of construction and in the combination and arrangement of the several parts of my improved mechanism to increase the efficiency of an engine whereby certain important advantages are attained, as will be hereinafter more fully set forth.

In order that my invention may be better understood, I will now proceed to describe the same with reference to the accompanying drawings, wherein:

Figure 1 is a diagrammatic view partly in section and partly in elevation illustrating a mechanism constructed in accordance with an embodiment of my invention, the crosshead being at the center of its stroke, the line of section being substantially on the line 1—1 of Figure 4.

Figure 2 is a view somewhat similar to Figure 1, with the crosshead at the limit of its inward stroke.

Figure 3 is a view similar to Figure 2 with the crosshead at the limit of its outward stroke.

Figure 4 is a detailed sectional view taken substantially on the line 4—4 of Figure 2.

Figure 5 is a fragmentary elevational view illustrating a further embodiment in connection with one of the details of the invention, and Figure 6 is a sectional view taken substantially on the line 6—6 of Figure 5.

The invention as illustrated in the accompanying drawings is somewhat diagrammatically disclosed and the parts are not drawn to any particular scale but it is believed that the disclosure made by the drawings is sufficient to enable the invention to be fully understood from the following description.

As illustrated in the accompanying drawings, my improved mechanism is employed in connection with a vertical type of engine and B denotes a base having extending upwardly from its top head 1 the usual type of guide members 2 for the crosshead H. The members 2 also provide a support for a conventional cylinder C in which operates in a well known manner a reciprocating piston P. As the valve mechanism for effecting the operation of the piston P forms no part of the present invention, a disclosure thereof is believed unnecessary. The piston P is operatively connected in a conventional manner with the crosshead H by the piston rod R.

In the present embodiment of the invention, the crosshead H is box-like and has its lower face open, as is clearly illustrated in Figure 4 of the drawings. Opposed side walls 3 of the head H are provided with the relatively large circular openings 4 of desired radius and which have a common axis. Snugly mounted within these openings 4 but free for rotation therein are the rotating members 5. It is believed to be apparent from the disclosure in the accompanying drawings that these members 5 rotate on a common axis or the axis common to the openings 3. These members 5 are connected by a crosshead, or wrist, pin 6 eccentric to the axial centers $a$ of the members 5.

Operatively connected, as at 7, with the intermediate portion of the crosshead, or wrist, pin 6 is the upper end portion of the pitman 8, the opposite end portion of which being operatively connected, as at 9, with the crank pin 10 of the crank 11 rotating with the shaft 12. The length of this pitman 8 is such as to have the crank 11 in upward vertical position when the crosshead H is at the top of its stroke and to have the crank 11 in a downward vertical position when the crosshead H is at the bottom of its stroke.

Carried by the outer faces of the rotating members 5 are the outstanding and radially directed arms 14, said arms being also in radial alignment with the crosshead pin 6 and extending outwardly beyond the members 5 at points thereof remote from the pin 6. Pivotally engaged, as at 15, with the outer end portion of each of the arms 14 is an end portion of an elongated rod 16. The center $c$ of the connection 15 is spaced from the center $b$ of the crosshead pin 6 a distance equal to the length of the stroke of the crosshead H and, of course, of the piston P.

The lower end portion of the rod 16 is freely mounted on the crankshaft 12, whereby the rod 16 can readily rock in a direction transverse to the shaft 12. The length of this rod 16 from the axial center $d$ of the opening 17 through which the shaft 12 snugly extends and the center $c$ of the connection 15 between the rod 16 and the arm 14 is such that when the crosshead H is at the top of its stroke the rod 16 will be substantially aligned with the then depending arm 14 or to have said arm 14 and rod 16 substantially in parallelism when the head H is at the top of its stroke and also at the bottom of its stroke.

It is now the general practice to have the throw of the crankshaft one-half of the stroke of the crosshead but it is the particular purpose of the present invention to increase the throw of the crank without requiring any increase in the stroke of the crosshead and its operating piston. In the invention herein disclosed, this increase in the throw of the crank will be coincident with the extent of offset of the center $b$ of the crosshead pin 6 with respect to the center $a$ of each of the rotating members 5. In other words, if the throw of the crank is to be 50%, the distance between the centers $a$ and $b$ will be one-fourth the distance between the center points $b$ and $c$. By this it is believed to be obvious that the extent of the offset of the center $b$ of the crosshead pin 6 will be the same as the increase in the throw of the crank.

It is known that in connection with a reciprocating engine, the crankshaft has a slight independent rotation when the piston P and the crosshead H are at the top or bottom of their stroke. This independent rotation of the shaft 12 and its crank 11 is within a range of approximately six degrees to either side of the true dead center of the crank 11. In Figure 2 the broken line $e$ indicates said true dead center while the broken lines $f$ indicate the angles at each side of said true dead center between which the crank 11 has this independent movement.

It is important that this independent movement of the crank 11 between these angles $c$ be utilized to prevent true centering or alignment of a rod 16 and its associated arm 14 which would otherwise result in a buckling of the rod 16 or have other disastrous effects upon the proper running of the engine. The lower or pivoted end portion of each of the rods 16 is provided with a downwardly disposed extension or tail-piece 18 provided with a slot 19, the transverse center of which is radial to the center $d$ of the opening 17 and the shaft 12. This slot 19 is of desired length and width and is equidistantly disposed beyond the opposite sides of the transverse center of the slot. Disposed through this slot 19 is a shaft 20 herein disclosed as rotatably supported by suitably spaced arms 21 depending from the head of the base B. Fixed to this shaft 20 and positioned within the slot 19 is an eccentrically mounted disk 22 of a diameter equal to the space between the elongated straight side walls 23 of the slot 19.

When the crosshead H, together with the piston P, is at the top or bottom of its stroke, the high point H of the disk 22 is substantially in alignment with the true center line $e$, there being, however, a slight independent rotation of the disk 22 between the angles $i$ at opposite sides of the true dead center line $e$ when the crosshead H is at the top or bottom of its stroke. The limited independent movement of the crank 11 between the angle $f$ will effect a unitary independent movement of the high point $h$ between the disk 22 and the angles $i$ which will result in the rocking of the rod 16 beyond the true dead center when the crosshead H is either at the top or bottom of its stroke, thus preventing the rod 16 and its associated arm 14 coming to such true dead center which would result in the buckling of the rod 16 or other injury to the engine.

It is also believed to be apparent from the foregoing that as the crosshead H reciprocates, the rod 16 will provide means for rotating the members 5 during the reciprocation of the crosshead 5 in such a manner as to so position the center $b$ of the crosshead pin 6 to compensate for the increased throw of the crank 11 and thereby make it possible to obtain increased efficiency without increasing the stroke of the crosshead H and, of course, its operating piston P.

It is also to be particularly pointed out that when the crosshead H, as illustrated in Figure 1, is at the center of its stroke, the arms 14, together with the crank 11, are at right angles to the path of reciprocation of the crosshead H but with the arms 14 oppositely disposed with respect to the crank 11. It is also to be noted that during the operation of the engine, the center point $b$ travels in a true circle and that when the crosshead H is at the top of its stroke, the point $b$ is uppermost and that when the crosshead H is at the bottom of its stroke the point $b$ is lowermost. As hereinbefore stated, the invention as hereinbefore disclosed is employed with a vertical type of engine. However, the invention can be employed with the same facility in connection with a horizontal type of engine and, therefore, in referring to the top of the stroke is to be included the equivalent of the crosshead being at the back end of its stroke and in referring to the crosshead being at the bottom of its stroke is to be included the equivalent of the crosshead being at the forward end of its stroke.

In the embodiment of the invention as illustrated in Figures 5 and 6, the radial arm 25 carried by one of the rotatable members of the crosshead is provided at its outer end with a laterally extended pivot member 26 which is disposed through an opening 27 provided in the upper or adjacent end portion of the rod 28 which operates similar to the rod 16 hereinbefore referred to. The opening 27 is of a diameter materially in excess of the diameter of the pivot member 26.

In radial communication with the opening 27 at equidistantly spaced points therearound are the grooves 29 herein disclosed as formed in a face of the rod 28. Mounted in these grooves 29 are the expansible members 30, herein disclosed as coil springs, which constantly urge the segmental plates 31 into close contact with the pivot member 26. Under normal conditions the tension of the springs 30 is sufficient to maintain desired pivotal connection between the rod 28 and the pivot member 26. However, in the event of any abnormal stress or strain being imposed upon the rod 28 from any cause during the operation of the engine, there will be sufficient yielding movement allowed in this pivotal connection to eliminate any interference to the desired operation of the engine and also to eliminate injury to any of the parts. It is also to be particularly pointed out that this pivotal connection or mounting as illustrated in Figures 5 and 6 serves to compensate for undue vibration incident to the operation of the engine.

As is clearly illustrated in Figure 4 of the drawings, each of the shafts 29 is driven from the adjacent shaft 12 by the constantly meshing gears 31, said gears being of the same ratio and operating to cause such shafts 12 and 20 to rotate at the same axial speed.

From the foregoing description it is thought to be obvious that a mechanism to increase the efficiency of an engine constructed in accordance with my invention is particularly well adapted for use by reason of the convenience and facility with which it may be assembled and operated.

What I claim is:

1. In an engine including a crank and a reciprocating crosshead, the crank having a throw greater than one-half the stroke of the crosshead; a member rotatably carried by the crosshead, a pitman, means for operatively connecting the pitman to the crank, means for operatively connecting the pitman to the rotary member of the crosshead at a point eccentric to the axial center of said rotating member, the extent of offset of the connection of the pitman with the rotary member with respect to the axial center of the rotary member being the same as the increased length of the throw of the crank, and means for effecting a complete rotation of the rotary member during each stroke of the crosshead.

2. In an engine including a crank and a reciprocating crosshead, the crank having a throw greater than one-half the stroke of the crosshead; a member rotatably carried by the crosshead, a pitman, means for operatively connecting the pitman to the crank, means for operatively connecting the pitman to the rotary member of the crosshead at a point eccentric to the axial center of said rotating member, the extent of offset of the connection of the pitman with the rotary member with respect to the axial center of the rotary member being the same as the increased length of the throw of the crank, and means for effecting a complete rotation of the rotary member during each stroke of the crosshead, the crank being at right angles to the path of travel of the crosshead when the crosshead is substantially at the center of its stroke.

3. In an engine including a crank and a reciprocating crosshead, the crank having a throw greater than one-half the stroke of the crosshead; a pitman, means for connecting the pitman to the crank, and means for connecting the pitman to the crosshead to allow said connection to rotate in a true circle upon reciprocation of the crosshead, said connection turning 360 degrees upon each stroke of the crosshead, the connection between the pitman and the crosshead being offset from the center about which said connection travels a distance equal to the throw of the crank in excess of one-half the stroke of the crosshead.

4. In an engine including a shaft having a crank and a reciprocating crosshead, the crank having a throw greater than one-half the stroke of the crosshead; a member rotatably carried by the crosshead, a pitman, means for operatively connecting the pitman to the crank, means for operatively connecting the pitman to the rotary member of the crosshead at a point eccentric to the axial center of said rotary member, the extent of offset of the connection of the pitman with the rotary member with respect to the center of the rotary member being the same as the increased length of the throw of the crank, a rod, means for supporting the rod for rocking movement, and means for connecting the rod to the rotary member to effect a complete rotation of the rotary member upon each stroke of the crosshead.

5. In an engine including a shaft having a crank and a reciprocating crosshead, the crank having a throw greater than one-half the stroke of the crosshead; a member rotatably carried by the crosshead, a pitman, means for operatively connecting the pitman to the crank, means for operatively connecting the pitman to the rotary member of the crosshead at a point eccentric to the axial center of said rotary member, the extent of offset of the connection of the pitman with the rotary member with respect to the center of the rotary member being the same as the increased length of the throw of the crank, a rod, means for supporting the rod for rocking movement, means for connecting the rod to the rotary member to effect a complete rotation of the rotary member upon each stroke of the crosshead, and means for rocking the rod beyond dead center during the period the crosshead is at the end of its stroke in either direction.

6. In an engine including a shaft having a crank and a reciprocating crosshead, the crank having a throw greater than one-half the stroke of the crosshead; a member rotatably carried by the crosshead, a pitman, means for operatively connecting the pitman to the crank, means for operatively connecting the pitman to the rotary member of the crosshead at a point eccentric to the axial center of said rotary member, the extent of offset of the connection of the pitman with the rotary member with respect to the center of the rotary member being the same as the increased length of the throw of the crank, a rod, means for supporting the rod for rocking movement, means for connecting the rod to the rotary member to effect a complete rotation of the rotary member upon each stroke of the crosshead, and means operated by the shaft during the rotation of the shaft when the crosshead is at the end of its stroke in either direction for rocking the rod beyond dead center.

7. In an engine including a shaft having a crank and a reciprocating crosshead, the crank having a throw greater than one-half the stroke of the crosshead; a member rotatably carried by the crosshead, a pitman, means for operatively connecting the pitman to the crank, means for operatively connecting the pitman to the rotary member of the crosshead at a point eccentric to the axial center of said rotary member, the extent of offset of the connection of the pitman with the rotary member with respect to the center of the rotary member being the same as the increased length of the throw of the crank, a rod, means for operatively and pivotally connecting the rod with the rotary member at a point spaced from the center of the rotary member a distance equal to the stroke of the crosshead, means for supporting the rod for rocking movement, and means for rocking the rod beyond dead center during the period the crosshead is at the end of its stroke in either direction.

8. In an engine including a shaft having a crank and a reciprocating crosshead, the crank having a throw greater than one-half the stroke of the crosshead; a member rotatably carried by the crosshead, a pitman, means for operatively connecting the pitman to the crank, means for operatively connecting the pitman to the rotary member of the crosshead at a point eccentric to the axial center of said rotary member, the extent of offset of the connection of the pitman with the rotary member with respect to the center of the rotary member being the same as the increased length of the throw of the crank, a rod, means for operatively and pivotally connecting the rod with the rotary member at a point spaced from the center of the rotary member a distance equal to the stroke of the crosshead, means for supporting the rod for rocking movement, said rod being provided with a slot, a shaft disposed through the slot, a disk within the slot and eccentrically mounted on the second shaft, and a driving connection between the second shaft and first shaft for driving the second shaft at the same axial speed as the first shaft, said eccentric disk providing means to rock the rod beyond dead center during the period the crosshead is at the end of its stroke in either direction.

9. An engine comprising a cylinder, a piston reciprocable therein and having a piston rod, a cross head with which said rod is connected, a crank having a throw greater than half the stroke of the piston and cross head, a connecting rod operatively coupled at one end with the crank, an operative coupling between the other end of the connecting rod and the cross head which is so constructed and arranged that the cross head and the connecting rod may have a degree of relative movement corresponding to the difference between the stroke of the piston and the throw of the crank, and means for positively relatively moving the cross head and adjacent end of the connecting rod to allow for the increased throw of the crank, during the inward and outward movements of the piston.

10. An engine comprising a cylinder, a piston reciprocably positioned therein and having a piston rod, a cross head with which said rod is connected, a crank having a throw greater than half the stroke of the piston and cross head, a connecting rod operatively coupled at one end with the crank, means connecting the other end of the connecting rod with the cross head by which the said other end of the connecting rod is movable in a circle having its axis perpendicular to and passing through the axial center of the piston and piston rod, the radius of the circular path of movement of the said other end of the connecting rod corresponding to the difference between the stroke of the piston and the throw of the crank, and means forming a driving connection between the crank and the said means by which the connecting rod is coupled with the cross head, for imparting positive rotational movement of the said other end of the connecting rod through said circular path during the reciprocatory movement of the cross head.

JOHN HENRY TRAHIN